Patented May 28, 1940

2,202,212

UNITED STATES PATENT OFFICE 2,202,212

PREPARATION OF GUANYL-UREA-N-SULPHONIC ACID

Hans Z. Lecher, Plainfield, and Alan E. Pierce, Bound Brook, N. J., assignors, by mesne assignments, to American Cyanamid Company, New York, N. Y., a corporation of Maine No Drawing. Application July 13, 1938, Serial No. 218,946

11 Claims. (Cl. 260—513)

This invention relates to an improved process for producing guanyl-urea-N-sulphonic acid.

Guanyl-urea-N-sulphonic acid, which is useful as an intermediate for the stabilization of aromatic diazo compounds against coupling, has been prepared in the past by dehydrating guanyl-urea sulphate. The original process used acetic anhydride in the presence of small amounts of zinc acetate but the process is not very efficient and an improved process was developed using inorganic acid halides, this improved process forming the subject matter of the copending application of Lecher and Pierce, Serial No. 153,278 filed July 12, 1937, now Patent No. 2,139,621.

According to the present invention, a still more efficient method has been developed which consists in the direct sulphonation of guanyl-urea by means of chlorsulphonic acid, its alkali and alkaline earth metal salts, or its esters. Guanyl-urea itself may be used, but preferably its salts with inorganic acids such as the sulphate, a hydrohalide, the phosphate, the borate, etc., are employed. The following equation indicates how the process proceeds, the formula for the guanyl-urea-N-sulphonic acid being the most probable one although it is not definitely known that the sulphonic group is attached to the amino group shown:

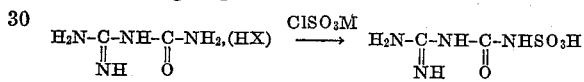

in which X is an acid radical and M is hydrogen, or an alkali or alkaline earth metal, or alkyl. It is possible, though unlikely, that the sulphonic group may be attached to another amino group.

While chlorsulphonic acid does operate effectively in the process, it is preferable to use the sodium salt of chlorsulphonic acid because the latter can be obtained very cheaply by reaction of sulphur trioxide with sodium chloride under suitable conditions. The product is probably not pure sodium chlorsulphonate but usually contains some occluded sulphur trioxide. It is, however, a very effective sulphonating agent and operates smoothly in the process. Other alkali and alkaline earth salts such as the potassium or calcium salt may also be used.

When free chlorsulphonic acid is employed, it is necessary to use an inert liquid solvent such as, for example, symmetrical tetrachlorethane. Salts of chlorsulphonic acid may be used without a diluent or solvent although even in this case it is preferable to use a solvent or diluent as the process is simplified and improved. Efficient mixture is an important factor and when a diluent is used, effective stirring should be provided. When no diluent is used with salts, the components must be thoroughly ground and mixed together, for example, in a ball mill.

In case an ester of chlorsulphonic acid such as chlorsulphonic acid ethyl ester is used, a solvent or diluent may be used. However, the yields are better without it.

It is not essential that the reagents be readily soluble in the diluent or solvent employed although a certain degree of solubility can probably theoretically be assumed. Thus, for example, guanyl-urea sulphate and sodium chlorsulphonate are almost insoluble in o-dichlorbenzene but can be readily caused to react in a slurry in o-dichlorbenzene. The guanyl-urea-N-sulphonic acid obtained is also practically insoluble in water which makes it easy to isolate it.

In choosing an inert diluent the field of choice is somewhat restricted in view of the fact that it is necessary to employ a diluent which will not react with the chlorsulphonic component, the guanyl-urea component or the guanyl-urea-N-sulphonic acid at reaction temperature and inertness of the diluent to these three compounds is necessary.

The reaction does not require a rigidly maintained temperature range. It proceeds satisfactorily with moderate heating at a reaction temperature in the range between 50 and 150° C. At lower temperatures outside this range the reaction is too slow and at sufficiently low temperatures apparently does not start at all and at temperatures above 150° C., there is a tendency for the guanyl-urea compounds to decompose with the formation of undesirable impurities. The optimum temperature varies to some extent depending on whether the process is carried out with free guanyl-urea or with a salt, with free chlorsulphonic acid, with a salt or with an ester. To some extent the optimum temperature will depend also on the particular salts used. We find that when reacting guanyl-urea sulphate with sodium chlorsulphonate in a diluent, a temperature of around 125° C. gives excellent results. The reaction follows the equation:

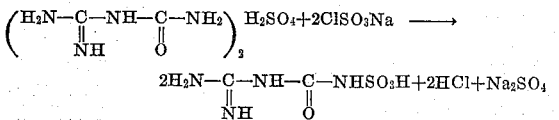

HCl is given off during the reaction and therefore the vessel should preferably be constructed of materials which will not be attacked by the dry hydrogen chloride. Nickel-lined vessels give excellent service.

The separation of the guanyl-urea-N-sulphonic acid from the small amount of by-products formed is relatively easy because the by-products are soluble in water; the suphonic acid is only slightly soluble at ordinary temperatures. It is therefore a simple matter to obtain relatively pure sulphonic acid by washing with sufficient amounts of cold water. Still higher purity can be obtained by dissolving the suphonic acid in caustic soda solution and reprecipitating with acid.

At elevated temperatures guanyl-urea-N-sulphonic acid is hydrolyzed by aqueous mineral acid to guanyl-urea sulphate. It is therefore advantageous to precipitate the sulphonic acid from its alkaline solution by means of a weak or a volatile acid and we have found that a very effective method consists in using sulphur dioxide as a precipitating agent. The precipitated sulphonic acid should be thoroughly washed to remove any remaining traces of non-volatile acid otherwise it will decompose on drying or show poor keeping qualities.

The invention will be described in greater detail in conjunction with the following specific examples in which the parts are given by weight. The sodium chlorsulphonate referred to in the examples is the crude reaction product of sodium chloride and sulphur trioxide.

Example 1

13.8 parts of guanyl-urea hydrochloride, 16 parts of chlorsulphonic acid and 240 parts of symmetrical tetrachlorethane are stirred and heated together for four hours at 125° C. The solid obtained is treated with cold water. The water-insoluble material, which consists of crude guanyl-urea-N-sulphonic acid, is dissolved in dilute sodium hydroxide solution. The solution is clarified, and acidified by passing in sulphur dioxide. The pure sulphonic acid precipitates out and is brought on a filter, washed and dried.

Example 2

20 parts of guanyl-urea hydrochloride and 25 parts of sodium chlorsulphonate are ground together and heated for four hours at 135° C. Pure guanyl-urea-N-sulphonic acid is obtained by treating the resulting solid as described in the first example.

Example 3

13.9 parts of guanyl-urea hydrochloride and 20.7 parts of sodium chlorsulphonate are stirred and heated in 195 parts of o-dichlorbenzene for four hours at 125° C. The resulting solid is treated as described in the first example and pure guanyl-urea-N-sulphonic acid is obtained.

Example 4

3 parts of guanyl-urea (base), 5 parts of sodium chlorsulphonate and 65 parts of o-dichlorbenzene are heated together at 125° C. for one hour, the charge being stirred. The solids are filtered off and worked up as in the previous examples.

Example 5

30.2 parts of anhydrous guanyl-urea sulphate and 34.6 parts of sodium chlorsulphonate are ground together and heated at 125° C. for five hours. The resulting solid is treated as described in the first example and pure guanyl-urea-N-sulphonic acid is obtained.

Example 6

30.2 parts of anhydrous guanyl-urea sulphate and 55 parts of sodium chlorsulphonate are stirred and heated in 390 parts of o-dichlorbenzene for four hour hours at 125° C. The whole charge is dumped into ice water and filtered. The residue is washed with water and dissolved in dilute sodium hydroxide solution. This solution is clarified and acidified by passing in sulphur dioxide. The guanyl-urea-N-sulphonic acid precipitates out, is brought on a filter, washed and dried. The dichlorbenzene may be recovered almost quantitatively from the first filtrate by steam stripping.

Example 7

15.1 parts of anhydrous guanyl-urea sulphate, 13.6 parts of calcium chlorsulphonate and 240 parts of symmetrical tetrachlorethane are heated at 125° C. for four hours, the charge being continuously stirred. Hydrogen chloride is evolved.

The solid is filtered off and added to 300 parts of ice water. Soda ash is added, the slurry is warmed to 45° C. and filtered. The filtrate contains the sodium salt of the desired sulphonic acid, and the free acid is isolated by acidification.

Example 8

13½ parts of guanyl-urea hydrochloride and 42.8 parts of ethyl chlorsulphonate are heated together at 95°, the mixture being stirred. Ethyl chloride is given off. After 45 minutes the solid reaction product is filtered off and washed with benzene. It consists of guanyl-urea-N-sulphonic acid which is purified as in Example 1. The yield is excellent.

In the claims the salts of the alkali metals and alkaline earth metals will be referred to as salts of the alkali forming metals.

This application is in part a continuation of our copending application, Serial No. 196,624 filed March 18, 1938.

What we claim is:

1. A method of producing guanyl-urea-N-sulphonic acid which comprises bringing about reaction between a compound included in the group consisting of guanyl-urea and inorganic salts of guanyl-urea and a compound included in the group consisting of chlorsulphonic acid, chlorsulphonic acid salts of alkali forming metals and its esters at a temperature between 50° and 150° C.

2. A method of producing guanyl-urea-N-sulphonic acid which comprises bringing about reaction between an inorganic salt of guanyl-urea and a compound included in the group of chlorsulphonic acid, chlorsulphonic acid salts of alkali forming metals and its esters at a temperature between 50° and 150° C.

3. A method of producing guanyl-urea-N-sulphonic acid which comprises bringing about reaction between a compound included in the group consisting of guanyl-urea and inorganic salts of guanyl-urea and a chlorsulphonic acid salt of an alkali forming metal at a temperature between 50° and 150° C.

4. A method of producing guanyl-urea-N-sulphonic acid which comprises bringing about reaction between an inorganic salt of guanyl-urea and a chlorsulphonic acid salt of an alkali forming metal at a temperature between 50° and 150° C.

5. A method of producing guanyl-urea-N-sulphonic acid which comprises bringing about reaction between a compound included in the group consisting of guanyl-urea and inorganic salts of guanyl-urea and the reaction product of sulphur trioxide and sodium chloride at a temperature between 50° and 150° C.

6. A method of producing guanyl-urea-N-sulphonic acid which comprises bringing about reaction between a compound included in the group consisting of guanyl-urea and inorganic salts of guanyl-urea and a compound included in the group consisting of chlorsulphonic acid, chlorsulphonic acid salts of alkali forming metals and its esters at a temperature between 50° and 150° C. in the presence of an inert organic diluent liquid.

7. A method of producing guanyl-urea-N-sulphonic acid which comprises bringing about reaction between a compound included in the group consisting of guanyl-urea and inorganic salts of guanyl-urea and a compound included in the group consisting of chlorsulphonic acid, chlorsulphonic acid salts of alkali forming metals and its esters at a temperature between 50° and 150° C. in the presence of symmetrical tetrachlorethane.

8. A method of producing guanyl-urea-N-sulphonic acid which comprises bringing about reaction between a compound included in the group consisting of guanyl-urea and inorganic salts of guanyl-urea and a compound included in the group consisting of chlorsulphonic acid, chlorsulphonic acid salts of alkali forming metals and its esters at a temperature between 50° and 150° C. in the presence of o-dichlorbenzene.

9. A method of producing guanyl-urea-N-sulphonic acid which comprises reacting the product obtained from sulphur trioxide and sodium chloride with guanyl-urea sulphate in the presence of a diluent at temperatures between 50° and 150° C.

10. A method according to claim 9 in which the reaction is carried out at approximately 125° C.

11. A method of producing guanyl-urea-N-sulphonic acid which comprises reacting a compound included in the group consisting of guanyl-urea and its inorganic salts with a chlorsulphonic acid salt of an alkali forming metal in a grinding mill in the absence of a diluent between 50° and 150° C.

HANS. Z. LECHER.
ALAN E. PIERCE.